Nov. 9, 1965 J. J. WALKER 3,217,091
CABLE TERMINATION WITH ANTICORONA SHIELD
Filed Nov. 10, 1961
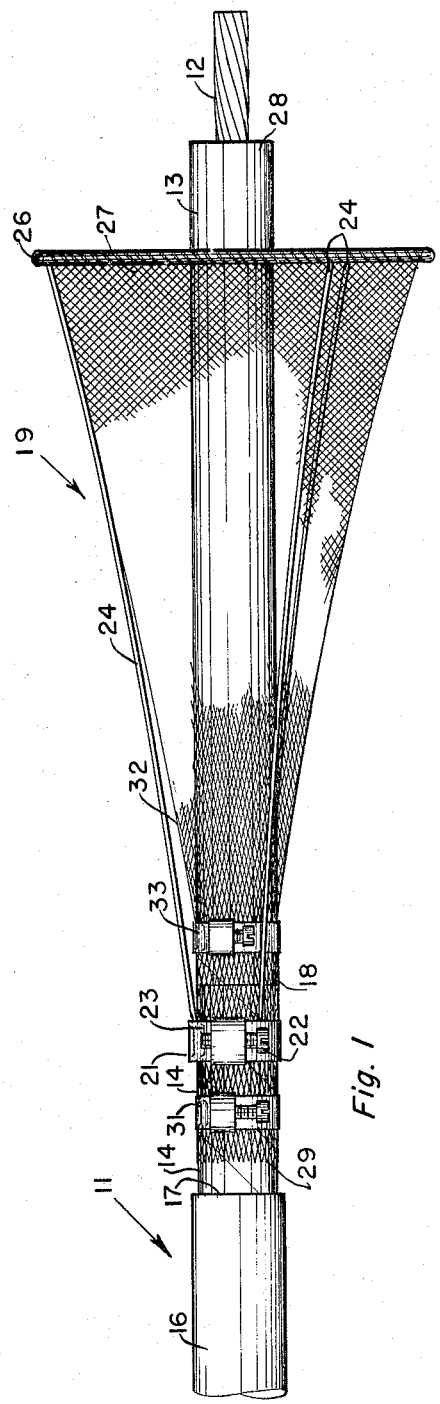
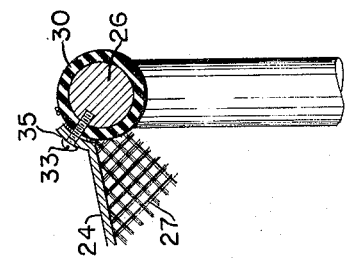
Fig. 2
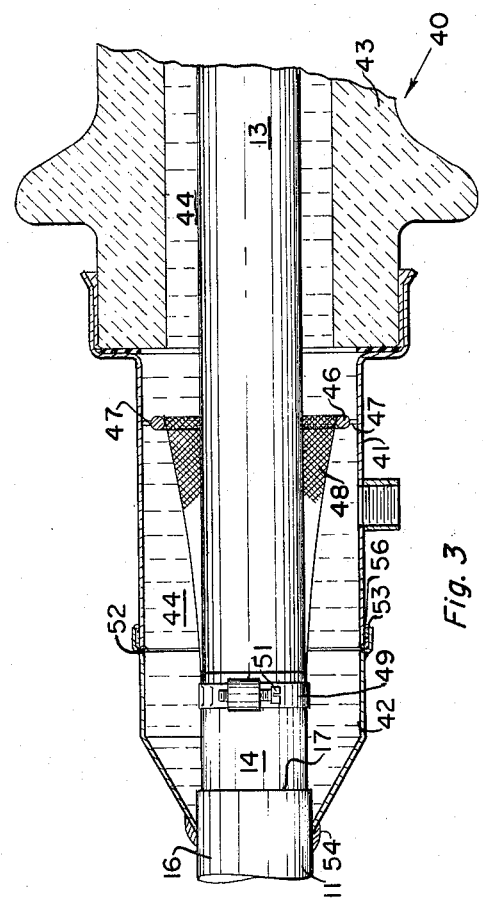
Fig. 3
INVENTOR.
JAMES JOHN WALKER
BY
*V. F. Voek*
HIS AGENT United States Patent Office 3,217,091
Patented Nov. 9, 1965

3,217,091
CABLE TERMINATION WITH ANTICORONA SHIELD
James J. Walker, Dobbs Ferry, N.Y., assignor, by mesne assignments, to Anaconda Wire and Cable Company, a corporation of Delaware
Filed Nov. 10, 1961, Ser. No. 151,487
6 Claims. (Cl. 174—73)

My invention relates to anticorona shields and particularly to anticorona shield for insulated electric cables and a method for terminating said cables.

In the termination or joining of high-voltage electric cables it has been known to build up a stress relief cone to increase the effective diameter of the cable at the point where the cable shield is terminated. This larger diameter at the point of termination reduces the electrical stress concentration and thus reduces the formation of corona and the likelihood of arcing or tracking. Prior art stress relief cones are laboriously built up by hand-wrapping dielectric tapes around the cable until a cone of the proper contour and dimensions has been constructed, and then wrapping a conductive shielding tape over the cone extending from the cable shielding to the point of maximum diameter. Not only is the building-up of stress cones by this taping procedure laborious and expensive but it also requires a special skill which is not always available at the time and place that a termination must be made. To meet this problem I have invented a stress relief cone anticorona shield that can be applied rapidly by any electrician.

My anticorona shield comprises a cable gripping band to which are fastened a plurality of support rods that spread outwardly and are fastened to a support ring of greater diameter than the band. A wire mesh defines a surface approximately circular in section between the ring and the band or between the ring and a point on a cable located between the ring and the band with the mesh electrically connected to the cable shield. A tubular wire braid may surround the cable with one end secured to the ring and the other end secured to the cable and connected to the insulation shield. My stress relief cone may be enclosed in a pothead and my invention may take the form of a cable termination comprising an electric cable with a conductor, a layer of insulation and an electric shielding surrounding the insulation and terminated at a point short of the termination of the insulation, and a pothead filled with insulating compound enclosing the termination. Within the pothead there is a wire mesh stress relief cone surrounding the insulation and means for supporting the cone from the pothead with the insulating compound penetrating the interstices of the mesh. The stress cone may be a flexible tubular wire braid fastened to a ring within the pothead with the braid assuming a concave profile.

I have also invented the method of terminating an electrical cable comprising the steps of fixing a wire mesh stress relief cone around the cable over the insulation with the cone making electrical contact with the cable shielding and tapering outwardly leaving a space between the insulation and the cone. I then cover the cone with a liquid dielectric which fills the interstices of the mesh and the space between the cone and the insulation and forms a layer outside of the cone.

A complete understanding of my invention may be obtained from the drawing.

In the drawing:
FIGURE 1 is a view in elevation of the shield of my invention.
FIGURE 2 is a detail, partly in section, of an embodiment of my invention.
FIGURE 3 is an elevation in section of an embodiment of my invention.

Referring to FIGURE 1 a cable indicated generally by the numeral 11 has a metallic conductor 12, wall of insulation 13, insulation shielding 14 comprised of electrically conducting tapes, and an outer jacket 16 of an insulating material such as neoprene. Instead of a jacket the cable may have a metal sheath such as a lead sheath without adversely affecting the utility of my invention. The cable jacket has been terminated at 17 to expose the shield 14 and the shield has been terminated at 18 to expose the insulation 13. The anticorona shield of my invention, indicated generally by the numeral 19 is comprised of a cable gripping band 21 which can be tightened in a known manner by means of a screw 22 and rack 23, rods 24 rigidly secured to the band 21 as by welding, a ring 26, and wire braid 27. The rods 24 spread apart from the band 21 and are welded to the ring 26 to support the latter concentrically around the cable 11. The insulation 13 is terminated at 28 to expose the conductor 12 at a point beyond the ring 26 so that the ring 26 surrounds the cable at a point remote from both the shield 14 and the conductor 12. The braid 27 which is securely fastened to the ring 26 continuously around its periphery is preferably in the form of a tube known as a "Chinese finger" which is drawn tight when lateral tension is applied to it. Such braids are commonly used in the cable art as pulling sleeves. However other forms of wire mesh can be used in my shield within the limits of my invention. The tube 27 has been slipped over the cable 11 and an end 29 of the tube 27 remote from the ring 26 has been drawn down on the cable over the shield 14 and in electrical contact therewith. The end 29 has been locked in position by a hose clamp 31 and the remainder of the shield 19 pushed forward toward the exposed conductor 12 until the braid 27 is taut. The tubular braid 27 is confined inside of the rods 24 and the band 21, and the band 21 has been tightened over the braid. It is a feature of my invention that the band 21 is wide enough to obtain a fair purchase on the cable 11 and maintain the ring 26 substantially concentric to the cable 11. It is known in the cable art that the surface of a stress relief cone should not be conical but curvilinear and of concave section. The formation of a proper concave surface in right section is one of the problems that require so much skill when tapes are applied by hand. It is a feature of my invention that when the tubular braid 27 is drawn tight it forms a concave profile 32 rather than a cone from the cable 11 to the ring 26. The exact shape of the profile 32 is further adjusted by a second hose clamp 33 that is fastened around the braid 27 on the other side of the band 21 from the hose clamp 31.

In FIGURE 2 I have shown the ring 26 covered by an insulating wall 30. In this case the rods 24 have curvilinear portions 35 that fit the ring 26 and are fastened thereto by screws 33. The mesh 27 is conveniently fastened to the ring 26 by clamping between the ring and the portions 35. The insulation 30 has the effect of further reducing the possibility of ionization of the air around the ring 26.

In FIGURE 3 the cable 11 is inserted in a pothead indicated generally by the numeral 40 and comprising a metallic bell or sleeve 41, a lower tapered adapter 42 and a ceramic insulator 43 sealed thereto. The entire pothead is filled with a dielectric compound 44 in a known manner. In this embodiment of my invention a ring 46 is supported by the pothead bell 41 by means of pins 47 and a tubular braid 48 is fastened to the ring 46 at its upper portion and to the shielding 14 at its lower portion by means of a hose clamp 49. In the assembly of the apparatus of FIGURE 3 the ring 46, braid 48, and clamp 49 are factory assembled, the lead sheath 16, shielding 14, insulation 13, and conductor 12 are cut to size. The cable end is inserted through the adapter 42 which is pushed back over the sheath. It is then inserted into the pothead 40 through the clamp 49, braid 48 and ring 46. The conductor is connected in the usual fashion not shown in the drawing, the clamp 49 is pulled down over the shielding 14 at the same time tightening the braid 48 to form the desired concave section. The clamp is then tightened by turning a screw 51 and the section 42 is raised until the end 52 of the sleeve 41 seats in a flange 53 of the adapter 42. The adapter is then wiped to the lead sheath 16 with a solder wipe 54 and a solder seal 56 is poured into the flange 53 to seal the adapter 42 to the sleeve 41. The pothead is then filled with the compound 44 in known manner with the compound flowing around and through the mesh 48 and wetting the surface of the entire insulation 13. In prior art methods of building a stress relief cone of insulating tapes it has been virtually impossible to prevent the formation of voids between the tape layers. Since the insulation of the illustrated stress cone is comprised entirely of high-dielectric-strength compound which can be poured at high temperatures and at low viscosity it is known to be entirely free from voids and no voids are introduced during the assembly of the termination.

I have invented new and useful articles of manufacture for which I desire an award of Letters Patent.

I claim:

1. An anticorona shield for a shielded electric cable, said cable comprising a conductor, insulation surrounding said conductor, and an insulation shield surrounding said insulation, comprising a band grpping said cable around said insulation shield, a plurality of support rods fastened to said band and spreading outwardly therefrom, a support ring of diameter greater than the diameter of said band fastened to said rods remote from said band, a flexible tubular wire braid surrounding said cable, said braid having an end secured to said ring and having a portion remote from said end secured to said cable at a point between said ring and said band, said braid being grounded to said insulation shield and assuming a concave profile between said ring and said cable.

2. An anticorona shield for a shielded electric cable comprising a conductor, insulation surrounding said conductor, and an electrically conducting insulation shield surrounding said insulation, said insulation shield being terminated at one section of said cable and said insulation being terminated at another section of said cable, said anticorona shield comprising a cable gripping band applied over said insulation shield and in electrical contact therewith, a plurality of support rods fastened to said band and spreading outwardly therefrom, a support ring of diameter greater than the diameter of said cable fastened to said rods around said cable at a point between the termination of said insulation shield and the termination of said insulation, a wire mesh fastened to said ring and to said cable and defining a surface tapering from said ring to said cable said mesh being electrically connected to said insulation shield.

3. An anticorona shield for a shielded electric cable comprising a conductor, insulation surrounding said conductor, and an electrically conducting insulation shield surrounding said insulation, said insulation shield being terminated at one section of said cable and said insulation being terminated at another section of said cable, said anticorona shield comprising a cable gripping band applied over said insulation shield and in electrical contact therewith, a plurality of support rods fastened to said band and spreading outwardly therefrom, a support ring of diameter greater than the diameter of said cable fastened to said rods around said cable at a point between the termination of said insulation shield and the termination of said insulation, a flexible tubular wire braid surrounding said cable having one end secured to said ring and having the other end secured to said cable at a point between said ring and said band said braid being electrically connected to said insulation shield and said braid assuming a concave profile between said ring and said cable.

4. A cable termination for the end of an electric cable having a conductor, a layer of insulation, and an insulation shield surrounding said insulation, comprising a pothead comprising an insulator and a metallic bell enclosing said end of said cable, a wire mesh stress relief cone within said bell surrounding said insulation and electrically connected to said insulation shield, said cone having a small end closely surrounding said cable and a large end surrounding said cable and spaced therefrom, means attaching said large end of said cone to said bell thereby supporting said cone, and fluid electrical insulating compound confined in said pothead penetrating said mesh and filling the space between said cable and said cone.

5. A cable termination for the end of an electric cable having a conductor, a layer of insulation, and an insulation shield surrounding said insulation, comprising a pothead comprising an insulator and a metallic bell enclosing said end of said cable, a ring concentric to said cable over said insulation within said bell, means attaching said ring to said bell thereby supporting said ring, a flexible tubular wire braid connecting said ring and said insulation shield, said ring spacing one end of said braid from said cable, said braid assuming a concave profile between said ring and said cable, and fluid electrical insulating compound confined in said pothead, penetrating said braid, and filling the space between said cable and said braid.

6. A cable termination comprising an electric cable having a conductor, a layer of cable insulation, and an electric shielding surrounding said insulation and terminating at a point short of the termination of said insulation, a wire mesh stress relief cone electrically connected to said shielding and extending over said insulation, an enclosure surrounding said cone and a body of liquid insulating compound within said enclosure, covering said mesh, filling the interstices thereof and filling the entire space between said cable insulation and said mesh.

References Cited by the Examiner

UNITED STATES PATENTS

| 1,664,100 | 3/28 | Austin | 174—127 |
| 1,778,891 | 10/30 | Earnhardt | 174—4 X |
| 1,889,570 | 11/32 | Rah | 174—75 |
| 2,174,377 | 9/39 | Bowden et al. | 174—73 X |
| 2,357,858 | 9/44 | Trees et al. | 174—73 |
| 2,396,283 | 3/46 | Pabst | 174—73 X |
| 2,498,589 | 2/50 | Steinke | 174—73 X |
| 2,857,453 | 10/58 | Laird | 174—73 |

FOREIGN PATENTS 327,883   3/58   Switzerland.

JOHN F. BURNS, Primary Examiner.

JOHN P. WILDMAN, DARRELL L. CLAY, Examiners.